United States Patent [19]

Eaton et al.

[11] 4,163,999
[45] Aug. 7, 1979

[54] ELECTRONIC CUTOUT CIRCUIT FOR VACUUM CLEANERS

[75] Inventors: Bradley C. Eaton, Pompton Plains; Thomas M. Taylor, Flanders, both of N.J.

[73] Assignee: The Singer Company, New York, N.Y.

[21] Appl. No.: 867,998

[22] Filed: Jan. 9, 1978

[51] Int. Cl.² .............................................. H02H 7/08
[52] U.S. Cl. ........................................ 361/23; 15/391
[58] Field of Search ................. 15/389, 390, 391, 319; 361/23, 24; 318/461, 463, 464

[56] References Cited

U.S. PATENT DOCUMENTS

| | | | |
|---|---|---|---|
| 2,421,235 | 5/1947 | Basinger | 15/390 X |
| 4,021,879 | 5/1977 | Brigham | 15/319 |

FOREIGN PATENT DOCUMENTS 2243105  3/1974  Fed. Rep. of Germany ............ 361/24

*Primary Examiner*—Harry E. Moose, Jr.
*Attorney, Agent, or Firm*—David L. Davis; Robert E. Smith; Edward L. Bell

[57] ABSTRACT

An upright vacuum cleaner having a brush roller rotatably driven by a belt from the cleaner motor and having a safety device for protecting the belt and motor when the brush rotation falls below a predetermined speed. The device includes a magnet in the brush roller, a rotation sensing circuit for generating a pulse for each revolution of the magnet and a motor shut-off circuit controlled by the sensing circuit to shut-off power to the motor when the pulse rate falls below that desired.

3 Claims, 3 Drawing Figures

ELECTRONIC CIRCUIT FOR VACUUM CLEANERS

BACKGROUND OF THE INVENTION

This invention relates to vacuum cleaners and more particularly to a safety or protective device for those cleaners having a belt driven agitator brush roller assembly.

Upright vacuum cleaners and power nozzle attachments for canister type vacuum cleaners include a rotatable brush roller assembly generally having a beater bar for effective cleaning of the floor covering. In the known cleaner and attachments of this type the brush rollers are driven by a rubber belt connected over a spindle of the output shaft of a universal motor. If for some reason the brush roller should become jammed and stops rotating, the torque of the rotating motor causes its rotating spindle to slip on the now substantially station-ary belt. The frictional forces on the belt effects a heating and excessive wear condition resulting shortly in a rupture of the belt. Since jamming of the brush roller can be caused by hair, twine or the like becoming entangled about the brush roller bearings, or by picking up cloth, clothing or other articles that can become wedged between the brush and chassis or about the bearings, the belt breakage problem is one that has plagued the vacuum cleaner industry for some time.

SUMMARY OF THE INVENTION

The present invention effects a solution of this problem by providing a brush roller rotation detection system that shuts off the motor when the brush roller rotation falls below a desired speed. The detector includes a rotation sensing circuit that senses pulses generated in dependence upon the rotation of the brush roller. If the pulse rate decreases below a preset amount the sensing circuit turns off a switch control circuit to open a line switch in the line with the motor to stop the motor.

In the preferred embodiment a magnet is embedded in the brush roller and a sensing coil is mounted adjacent the roller. As the brush roller rotates the sensing coil generates a voltage pulse every time the magnet passes the coil. Thus, rotation of the brush roller generates a series of voltage pulses, each of which trigger a transistor turning it on for a short time. As long as the brush roller is rotating above the predetermined rate the transistor keeps a capacitor discharged and prevents a second transistor from turning on. The second transistor acts to control the switch control circuit. When the second transistor is off the power supply charges a second capacitor that fires a trigger diode and discharges into the gate of a triac. When the second transistor is on the voltage across the second transistor is clamped below the trigger voltage of the trigger diode which thereby shuts off the gate signal to the triac. The triac is in series with the motor and when it is open the motor is shut.

Consequently, it is a primary object of the present invention to provide a protective system for a vacuum cleaner of the type having a motor driven agitator brush roller assembly for detecting a jammed brush roller condition and for shutting the motor when the condition occurs.

It is another object of this invention to provide a protective system for a vacuum cleaner of the type having a motor driven agitator brush roller, the system including a rotation detecting circuit for sensing pulses generated in dependence upon the rotation of the brush roller and for turning off a switch control to open a switch in the motor line thereby stopping the motor when the pulse rate decreases below a preset amount.

A further object of this invention is to provide in a vacuum cleaner of the type having an agitator brush roller driven by a belt from the motor a system for protecting the belt from breaking by shutting off the motor when the brush roller jams.

A still further object of this invention is to provide in an appliance having a motor driven rotatable working element engagable with a work surface, a system for protecting the motor by shutting off the motor when the rotatable working element jams.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
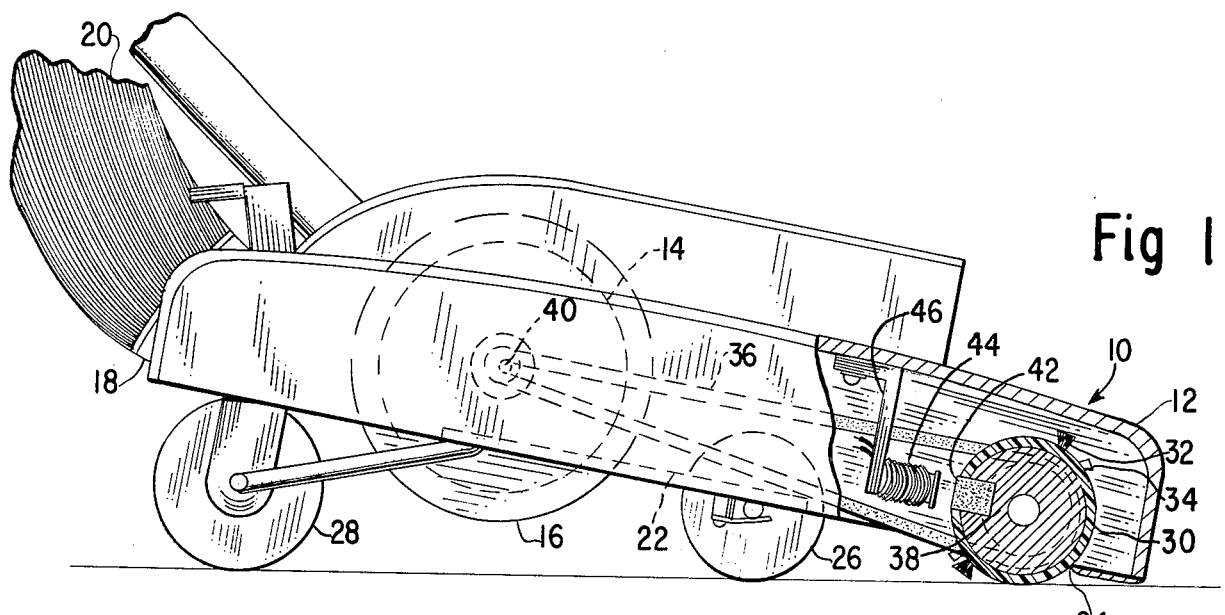
FIG. 1 is a side elevational view partly cut away and sectioned of an upright vacuum cleaner incorporating the features of the belt protecting system of the present invention.

Referring to FIG. 1 of the drawings the invention is disclosed as embodied in a vacuum cleaner 10 having a chassis 12 fashioned to support an electric motor 14 preferably a universal series type for driving at least one fan impeller (not shown) enclosed in a fan housing 16. The fan housing communicates with a discharge duct 18 to which a porous dust bag 20 may be connected. A bottom access plate 22 having an opening 24 forming a nozzle intake mouth is detachably held to the underside of the chassis and forms an intake air passageway communicating the nozzle mouth with the fan housing so that dust laden air is drawn into the intake nozzle and passes into and through the bag 20 to deposit the dust therein. The cleaner includes a pair of front wheels 26 and a pair of rear wheels 28 adjustably mounted on the underside of the cleaner so as to position the nozzle 24 for different types of floor surfaces and coverings.

Conventionally mounted in the chassis within the nozzle inlet 24 is an agitator brush roller assembly 30 which may include bristles 32 and a beater bar 34 for agitating and loosening the dust and dirt on a floor covering for removal by the air stream. As is conventional the brush roller 30 is driven by a flexible belt 36 comprised of rubber or a similar flexible material which may be trained about a groove 38 cut in the roller 30 and about a spindle 40 attached to the motor shaft. Thus, as the motor rotates the belt rotatably drives the brush roller assembly.

In accordance with the present invention a small permanent magnet 42 is embedded in the roller and a sensing coil 44 for generating pulses dependent upon the rotation of the roller is mounted adjacent the magnet. The sensing coil 44 preferably comprises a nylon bobbin having a soft iron core with a multiplicity of windings which may be secured to a bracket 46 adjacent the magnet. Thus, each time the magnet passes the coil and its field is cut, a voltage pulse is generated in the coil winding. It is contemplated that other sensing devices such as a Hall effect device may be used in place of the coil 44 without departing from the invention.

Figure 2:
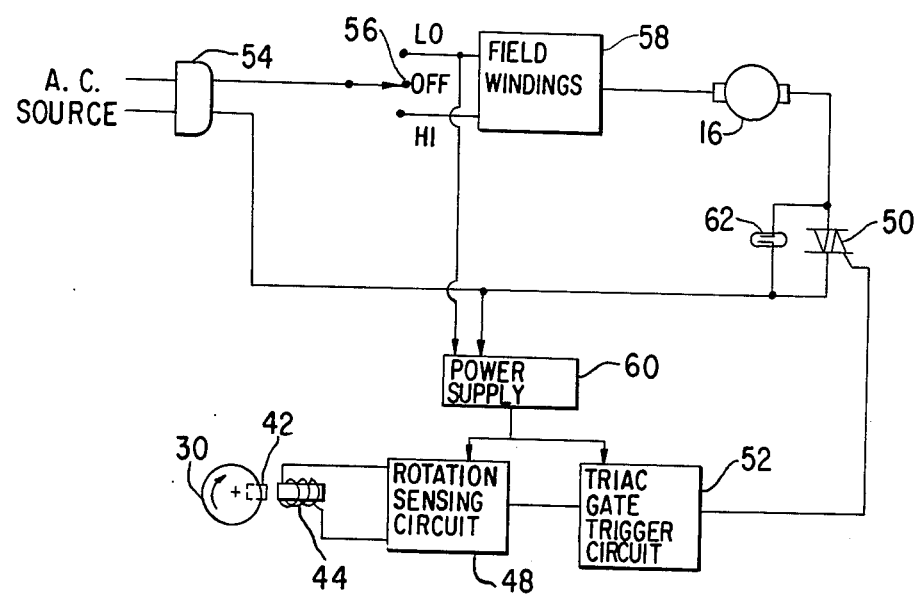
FIG. 2 illustrates in block diagrammatic form the rotation detector and motor shut-off system features of the preferred form of the present invention.

As illustrated in FIG. 2 the pulses or an absence of the pulses are detected by a rotation sensing circuit 48. A gate controlled switch such as a triac 50 is connected in series with the motor 16 and is controlled by a control circuit 52 which acts to trigger the gate of the triac as long as the roller is rotating above a predetermined speed. A conventional plug 54 supplies power from an a.c. source through a conventional switch of the cleaner which may be a two speed switch 56. As illustrated the motor 16 is of the conventional type used in vacuum cleaners with the field windings 58 in series with the armature. A d.c. power supply 60 for the rotation sensing circuit 48 and the control circuit 52 is connected across the motor circuit to supply the proper d.c. values for the operation of the circuit elements of the circuits as hereinafter described. Although not necessary for the operation of the invention, a neon lamp 62 may be connected across the triac 50 so when the motor is shut the lamp will light and indicate that the motor is shut because of jamming of the brush roll.

Figure 3:
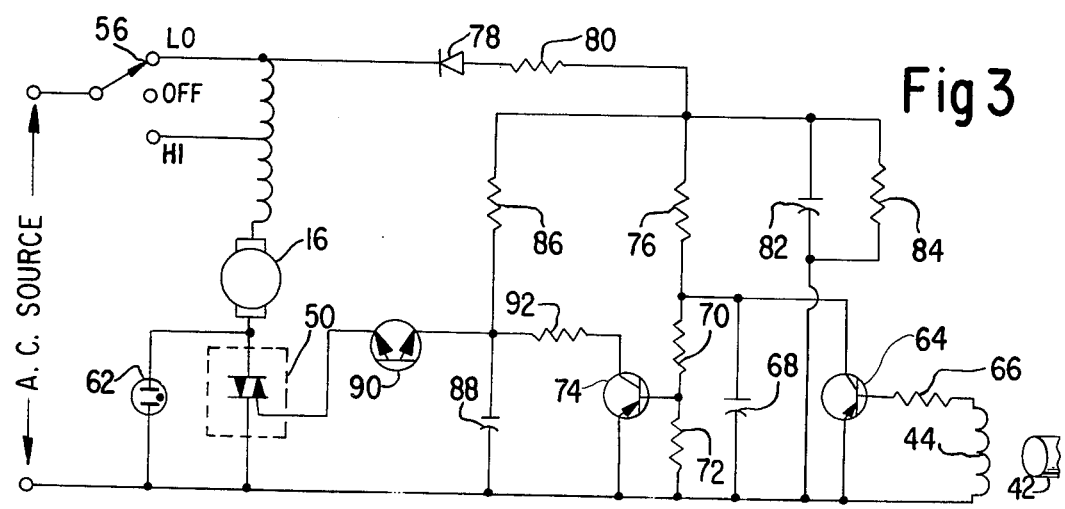
FIG. 3 is a schematic diagram of the preferred electronic circuit for the detector and shut-off system.

Referring now to FIG. 3 the rotation sensing circuit 48 includes a first transistor 64 with a current limiting resistor 66 connected between its base and the sensing coil 44 so that the voltage pulses generated in the coil 44 trigger the transistor 64, turning it on for a short time for each pulse. A capacitor 68 and a pair of resistors 70 and 72 are connected in parallel across the transistor. The resistors 70 and 72 form a voltage divider that provides the bias for a second transistor 74 for purposes hereinafter described. A resistor 76 is included to provide the proper time constant with the capacitor 68 for allowing the motor 16 to initially come up to speed when the switch 56 is turned on, at which time the brush roller is not rotating.

The power supply circuit 60 comprises a diode 78 for providing d.c., a resistor 80 and a capacitor 82. A bleed resistor 84 may be connected across the capacitor 82 if desired.

The control circuit, which is illustrated as triac gate trigger circuit 52, includes resistor 86, capacitor 88 and a trigger diode 90 which together form a relaxation oscillator. The trigger diode 90 may be a Diac and is an avalanche diode that fires whenever the breakdown voltage is exceeded in either polarity of applied voltage at which time it switches from a very high impedance substantially equivalent to an open circuit to a low impedance device. When the voltage across capacitor 88 reaches the trigger point the diode 90 fires to discharge the capacitor 88 into the gate of the triac 50, thereby turning it on (unless it is already on). The frequency of oscillation is chosen to keep the power lost to the motor small when the Diac turns off, which occurs every time the a.c. voltage changes polarity.

In operation the pulses of the rotating brush roller magnet 42 fire the transistor 64 as aforesaid. Thereafter, the transistor 64 keeps the capacitor 68 discharged so that the voltage on the capacitor 68 never gets high enough to allow the transistor 74 to turn on. Thus, when the voltage across the capacitor 88 reaches the trigger point of the diode 90 it fires and as described above the triac turns on providing a low impedance path for the current through the motor. However, when the brush roller jams, the pulses at the coil 44 cease and the transistor 64 turns off. This allows the capacitor 68 to charge toward the supply voltage. When the voltage across the capacitor 68 is high enough to turn on the transistor 74 the now low impedance of the transistor 74 shorts out capacitor 88 and clamps its voltage at a value below the trigger voltage of the diode 90. This shuts off the gate signal to the triac 50 which shuts off and opens the line to the motor 16 thereby shutting the motor. If a neon lamp 62 is incorporated into the circuit its high impedance also prevents sufficient power to flow through the motor for turning it on. Once the motor shuts off it cannot be turned back on unless power is first turned off at switch 56 to allow sufficient time for the capacitor 68 to discharge through resistors 70 and 72, and resistors 76 and 84 (if bleed resistor 84 is incorporated into the circuit) so as to allow the motor to come up to speed. By proper choice of the circuit elements the motor can be designed to shut off when the brush roller is either stopped completely or is rotating at a low speed.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a vacuum cleaner having a chassis, an electric motor mounted in the chassis, means for connecting said cleaner to a source of electric power including switch means in circuit with the motor, said switch means being selectively manually operable to a first position for denying electric power to said motor and to a second position for supplying electric power to said motor, an aperture formed in the chassis providing an air inlet, means driven by the motor for drawing dirt laden air into the inlet, a brush roller assembly rotatably mounted in the chassis and extending through the inlet, and means including a belt for rotatably driving the brush roller assembly from the motor, the improvement comprising sensing means responsive to rotation of the brush roller assembly below a predetermined speed when the motor is supplied with electric power for providing an output signal at a predetermined level, control means coupled to receive the output signal and responsive to the predetermined level of the output signal for removing power from said motor, and means responsive to the supplying of power to the motor by the switch means for delaying operation to the sensing means for a sufficient period to allow the motor to initially come up to speed.

2. The vacuum cleaner according to claim 1 wherein said sensing means includes safety means for maintaining said output signal at said predetermined level until said connecting means denies electric power to said motor.

3. The vacuum cleaner according to claim 1 wherein said sensing means includes a permanent magnet mounted on said brush roller assembly for rotation therewith, a sensing coil mounted on said chassis in close proximity to said permanent magnet and adapted to provide a voltage pulse in response to the movement of said magnet thereby, a first capacitor, means for charging said first capacitor from said electric power source when said connecting means is supplying electric power to said motor, means responsive to said voltage pulse for discharging said first capacitor, a second capacitor, means for charging said second capacitor from said electric power source when said connecting means is supplying electric power to said motor, means responsive to the charge on said first capacitor reaching a first predetermined threshold level for discharging said second capacitor, a first switching element serially connected with said motor, said first switching element including a control input responsive to an input signal thereon for providing a current path for said motor through said first switching element, and a second switching element connected between said control input and said second capacitor and responsive to the voltage on said second capacitor reaching a second predetermined threshold level for discharging said second capacitor into said control input so as to provide said input signal thereon.

* * * * *